United States Patent [19]

Larsson et al.

[11] Patent Number: 5,021,203
[45] Date of Patent: Jun. 4, 1991

[54] METHOD FOR REGULATION THE PRESSURE OF A LIQUID CONTAINED IN MOLD PORES WHICH COMMUNICATE WITH A MOLD CAVITY

[75] Inventors: Owe G. T. Larsson, Höganäs; Anders B. H. Aberg, Tollarp, both of Sweden

[73] Assignee: Toolvac Engineering AB, Perstorp, Sweden

[21] Appl. No.: 437,257

[22] Filed: Nov. 16, 1989

[30] Foreign Application Priority Data

Nov. 16, 1988 [SE] Sweden .................................. 8804129

[51] Int. Cl.$^5$ ....................... B29C 45/34; B29C 45/37; B29C 45/76
[52] U.S. Cl. ...................................... 264/40.3; 264/83; 264/500; 264/570; 264/DIG. 50; 425/812
[58] Field of Search ...................... 264/40.1, 40.3, 85, 264/500, 570, 523, DIG. 50, 83; 425/812, 98

[56] References Cited

U.S. PATENT DOCUMENTS

| 4,091,069 | 5/1978 | Allen | 425/812 |
|---|---|---|---|
| 4,107,115 | 8/1978 | Foulks, Jr. | 264/211 |
| 4,177,238 | 12/1979 | Allen | 264/348 |
| 4,208,177 | 6/1980 | Allen | 425/404 |
| 4,393,019 | 7/1983 | Geimer | 264/83 |
| 4,422,840 | 12/1983 | Posch et al. | 425/812 |
| 4,454,081 | 6/1984 | Soulier | 264/337 |
| 4,623,499 | 11/1986 | Fuma et al. | 264/83 |
| 4,629,650 | 12/1986 | Kataoka | 264/286 |

FOREIGN PATENT DOCUMENTS

| 2061874 | 6/1971 | Fed. Rep. of Germany | 425/98 |
|---|---|---|---|
| 47-20251 | 9/1972 | Japan | 264/83 |
| 62-170566 | 7/1987 | Japan | 264/83 |
| 85015899 | 4/1988 | Sweden . | |
| 929446 | 5/1982 | U.S.S.R. | 264/40.1 |

Primary Examiner—Jan H. Silbaugh
Assistant Examiner—Catherine Timm
Attorney, Agent, or Firm—Stevens, Davis, Miller & Mosher

[57] ABSTRACT

A method for the regulation of the process conditions in a moulding tool which is intended for the production of products of natural or synthetic polymers. The moulding tool is made up of one or more moulding parts made of sintered metal with communicating pores obtained by pressing at a high pressure and sintering at a high temperature of a powdered material. The moulding part or parts have a moulding cavity, such that the pores are open toward the moulding cavity. The outer envelop surface of the moulding tool is tightened against leakage. The method includes filling the communicating pores with a liquid with a high vaporizing temperature and regulating the pressure on the liquid in the pores by means of a suitable pressure producer connected with the communicating pores in the moulding tool.

22 Claims, No Drawings

METHOD FOR REGULATION THE PRESSURE OF A LIQUID CONTAINED IN MOLD PORES WHICH COMMUNICATE WITH A MOLD CAVITY

The present invention relates to a method for the regulation of the process conditions in a moulding tool intended for the production of products of natural or synthetic polymers, which moulding tool comprises one or more moulding parts made of a sintered metal with communicating pores. The moulding parts are obtained by pressing a powdered material at a high pressure and sintering at a high temperature. A moulding cavity is then made in the moulding part or parts, whereby the pores are open towards the moulding cavity, while the outer envelope surface of the moulding tool is tightened against leakage.

From the Swedish patent 8501589-9 it was known prior to the present invention to produce moulding parts of a sintered metal, whereby the moulding parts have communicating pores. A moulding cavity is produced in the moulding parts, which together constitute a mould intended for the production of products of natural or synthetic polymers by injection moulding.

When the moulding cavity has been completed the envelope surfaces are tightened. The center of this known process rests in the formation of a reservoir in the pore system of the mould for the temporary reception of air or another gas formed during the injection moulding. When the mould is opened after each production cycle the gas is released again from the reservoir.

The known process disclosed above works very well. In some applications there are, however, difficulties in regulating the process conditions in the moulding tool. Moreover, in certain cases the pores will be clogged by by-products formed during the moulding of the polymer products.

For instance during the injection moulding of thermoplastics in steel moulds, about 80 % of the production cycle often consists of cooling time. The thermoplastic is injected via a gate or another nozzle into the moulding cavity at a temperature of about 150–220° C. The plastic product is cooled in the moulding cavity by convection and the heat is removed by water cooling in channels situated outside the moulding chamber or drilled into the mould steel.

When cooling channels are placed in the mould steel, they can make the mould construction weaker. Of course, this is especially true for small areas. A weak mould construction cannot be accepted. Therefore, certain areas of the mould are not provided with cooling channels, which of course results in insufficient cooling.

There is another considerable problem in arranging cooling channels in connection with a complex moulding cavity. This results in uneven cooling or tempering of the moulding cavity and also in the deterioration of the quality of the plastic product.

Another very frequent problem, especially during the production of big products, is that the flow paths i.e. the distance from the injection site to the middle of the product, is so long that the plastic cools too much before it has filled the whole cavity. Then, certain inner parts of the cavity will not be filled.

Moreover, especially during the moulding of thermosetting resins and rubber it is often difficult to release the product formed from the mould unless a lubricant has been manually applied to the moulding cavity before each moulding cycle. Said work is detrimental to the environment and very unpleasant.

Sometimes it is also difficult to get all parts of a product made of thermosetting resin fully cured.

Thus, there are big problems to in regulating the process conditions during the moulding of synthetic and natural polymers such as thermoplastics, thermosets and rubber.

According to the present invention the above problems have been solved and a method for the regulation of the process conditions in a moulding tool intended for the production of products of natural or synthetic polymers has been brought about. The moulding tool comprises one or more moulding parts made of a sintered metal with communicating pores obtained by pressing a powdered material at a high pressure and sintering at a high temperature. A cavity is then made in the moulding part or parts. The pores are open towards the moulding cavity while the outer envelope surface of the moulding tool is tightened against leakage.

The process according to the invention comprises filling the communicating pores with a liquid with a high vaporizing temperature. The pressure on the liquid in the pores is regulated by means of a suitable pressure producer connected with the communicating pores in the moulding tool. Usually the pressure is arranged to be automatically increased to counteract the inner pressure of the mould against the liquid in the pores when polymer is introduced into the closed moulding tool. The pressure is then automatically decreased when the moulding tool is opened again and the inner pressure of the mould is released. In this way the pores will preferably be filled with the above liquid during the whole production cycle.

Since the pressure on the liquid in the pore system is regulated automatically in the disclosed manner, the liquid will preferably be stationary in the pore system. Thus, the liquid generally will not be pressed back into the pores from the moulding cavity when the inner pressure increases at the supply of polymer to the closed moulding tool. Accordingly, suitably the liquid will not pulse backwards and forwards in the pore system during the production cycle.

However, in some cases the liquid may be allowed to be pressed back up to a few millimeters into the pores for a short time when the mould is closed. Then the liquid will be pressed forward again to reach the surface of the moulding cavity. A clogging of the pores will be avoided by said embodiment of the invention too.

Advantageously, a pressure sensor is placed in connection with the moulding cavity to sense the pressure in the moulding cavity. Thereby, precise pressure regulation can be achieved. The pressure sensor is then connected with the pressure producer and regulates the pressure on the liquid in the pores, which is applied by said pressure producer.

The pressure producer can for instance be a pump or a gas container. If a gas container is used the gas will exert a pressure on the liquid. Of course the pressure in the gas container can be regulated to any desired value. Many different gases can be used. However, nitrogen, carbon dioxide or air are examples of suitable gases.

When carbon dioxide is used as a pressure medium the reaction conditions during the moulding of certain thermosetting resins can be influenced. Thus, during the curing of some thermosetting resins water is formed which together with the carbon dioxide forms carbonic acid. In this way the pH of the resin in the mould will be decreased. In this manner, the curing reaction of the resin can be influenced.

The gases also influence the wetting of the polymer material against the moulding cavity.

During the moulding of a thermosetting resin a gaseous state curing agent or catalyst which is inert to the liquid in the pores may be used as a pressure medium for said liquid. The curing agent or catalyst will pass through the liquid and reach the resin in the moulding cavity in a concentration large enough to cure of the resin.

Examples of the gaseous curing agents or catalysts which can be used are sulphur dioxide, a tertiary amine such as triethylamine or trimethylamine, methyl formate, ethyl formate and propyl formate Usually said gaseous curing agents or catalysts are mixed with a carrier gas such as air or nitrogen. In this way the concentration of the curing agent or catalyst in the gas mixture can be varied in any desirable proportion.

It is very important that the pressure is kept at such a level that the liquid will not spout out into the moulding cavity when the moulding tool is opened and the inner pressure of the mould is released. Instead the liquid should be forced out very slowly from the pores into the moulding cavity and form a thin layer on the surface of the moulding cavity. This layer can work as a lubricant or release agent in the moulding cavity. Therefore, the use of a conventional lubricant or release agent which is sprayed in the moulding cavity or supplied in another way can often be avoided. Of course this is another advantage according to the invention.

The liquid prevents the pores from being clogged by by-products formed during the moulding of the polymer products or by fillers etc in the polymer material used. Accordingly, such by-products will be included in the polymer product instead of clogging the pores in the porous moulding parts of the moulding tool.

The liquid is intended for absorbing air, steam and other gases which are possibly formed during the moulding. These gases can then be released from the liquid when the moulding tool is opened after each production cycle. If necessary the liquid can also be removed from the pores at certain intervals to be degassed.

Since the liquid is evenly distributed in the whole pore system, an even tempering of the moulding tool is obtained.

If necessary the moulding tool can be heated or cooled by outside aggregates and/or by circulating a temperature regulating medium via channels with tight walls arranged in the porous moulding parts or any other parts of the moulding tool.

Usually, the temperature in the moulding tool is regulated to between about +50° C. and about +240° C. However, of course it is possible to work outside this interval also. The ultimate upper limit for the temperature is the vaporizing temperature of the liquid used.

Many different kinds of natural and synthetic polymers can be worked according to the invention. However, mainly thermoplastics and thermosets are intended to be used. Polyvinyl chloride, polyamide, polyester, polyurethane, urea-formaldehyde resin, phenol-formaldehyde resin and melamine-formaldehyde resin are examples of suitable plastics. Different kinds of rubber are also suitable.

The pore size of the sintered material can be varied within wide limits. However, suitably the average particle size is about 10–200 μm, preferably 10–100 μm.

The moulding tool is mainly intended for injection moulding, compression moulding, blow moulding or extrusion.

The liquid used can be a synthetic or a natural product such as an ester, silicon oil, wax or paraffin. The ester can consist of a reaction product of a polyhydric alcohol such as pentaerythritol, trimethylolpropane or neopentyl glycol and a monocarboxylic acid and/or a di-basic or tri-basic carboxylic acid.

The liquid used, for example in the form of an ester, has suitably hydrophilic properties, whereby the absorption of steam during the production cycle is facilitated. The hydrophilic properties can be obtained by an ammonium ion, a protonized amine or a protonized substituted amine in the ester.

From a general point of view the following is valid for the liquid used according to the present invention:
1. It should not be charred during use.
2. It should have a vaporizing temperature above the temperature existing in the moulding tool, i.e. usually above about 250° C.
3. It should be able to dissolve (absorb) gases released during the moulding.
4. It should be inert and not influence the properties of the polymer product produced.
5. It should not be oxidized during use.

The liquid used, for example in the form of an ester as disclosed above, can be used as such or in an aqueous solution or an aqueous emulsion. The water content can be varied within wide limits. However, normally it is between about 0.005 and about 15 per cent by weight, preferably about 0.1 and 12 per cent by weight or 0.5 and 8 per cent by weight. The liquid can also contain an emulsifier.

The liquid used can suitably contain a component consisting of a mixture of compounds with the general formula:

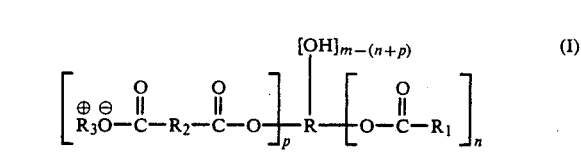

where R means

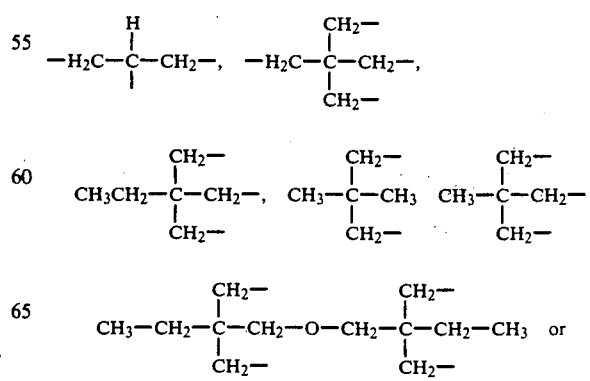

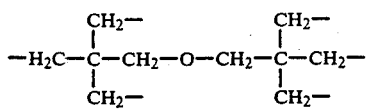

$R_1$ means $C_4H_9$, $C_5H_{11}$, $C_6H_{13}$, $C_7H_{15}$, $C_8H_{17}$, $C_9H_{19}$, $C_{11}H_{23}$, $C_{13}H_{27}$, $C_{15}H_{31}$, $C_{17}H_{35}$, $C_{17}H_{33}$, $C_{17}H_{31}$, $C_{19}H_{39}$, $C_{21}H_{43}$, $C_{23}H_{47}$ or $C_{17}H_{34}OH$, where $R_2$ means $C_2$, $C_2H_4$, $C_3H_6$, $C_4H_8$, $C_7H_{14}$, $C_8H_{16}$, $C_2H_2$, $C_6H_4$, $C_6H_3$ COOH, $C_6H_3$COO$-NH_4$,

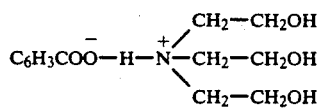

or $C_6H_{10}$ and $R_3^\oplus$ consists of an ammonium ion, a protonized monoethanolamine, diethanolamine, triethanolamine, diisopropanolamine, triisopropanolamine, N,N-dimethylethanolamine, N,N-dimethylaminometylpropanol, aminomethylpropanol, triethylamine or morpholine, at the same time as the compounds in the mixture only differ from each other with respect to the values for m, n and p, so that also the mixture can be represented by the above formula I, whereby the mean value ($\overline{m}$) for m is between 3 and 8, the mean value ($\overline{n}$) for n is less than ($\overline{m}$) and the mean value ($\overline{p}$) for p is between 0.5 and 8, preferably between 0.5 and 3.

One suitable component to be used according to the invention has the above formula where R means

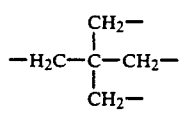

$R_1$ means $C_7H_{15}$ or $C_{17}H_{33}$,
$\overline{n} = 2.0 - 3.5$
$R_2$ means $C_2H_4$, $C_3H_6$, $C_4H_8$, $C_7H_{14}$, $C_8H_{16}$, $C_2H_2$ or $C_6H_4$;
$R_3^\oplus$ means a protonized triethanoamine, diethanolamine, N,N-dimethylaminomethylpropanol, N,N-dimethylethanolamine or triisopropanolamine;
$\overline{p} = 0.5 - 2.0$ and
$\overline{m} = 4$.

Other specific compounds suitable to be used according to the invention have the above formula, where R means

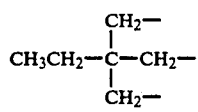

$R_1$ means $C_7H_{15}$ or $C_{17}H_{33}$,
$\overline{n} = 1.0 - 2.5$
$R_2$ means $C_2H_4$, $C_3H_6$, $C_4H_8$, $C_7H_{14}$, $C_8H_{16}$, $C_2H_2$ or $C_6H_4$;
$R_3^\oplus$ means a protonized triethanolamine, diethanolamine, N,N-dimethylaminomethylpropanol, N,N-dimethyletanolamine or triisopropanolamine;
$\overline{p} = 0.5 - 1.5$ and
$\overline{m} = 3$.

The present invention will be explained further in connection with the embodiment examples below, of which examples 1-7 relate to the production of specific components intended to be used according to the invention. Examples 1-7 show the components before neutralization, while examples 8-14 show corresponding components after neutralization.

EXAMPLE 1

1 mole (136.2 g) of trimethylol propane (TMP), 1 mole (273.3 g of) oleic acid and 65 g of xylene were charged into a glass bulb provided with a stirrer, a water separator, a thermometer and an inert-gas supply. The xylene was used for the azeotropic removal by distillation of any esterification water formed.

The temperature was raised successively to 250° C., whereupon any esterification water formed was separated. At an acid number less than 3 mg KOH/g, the reaction was stopped. The remaining xylene was separated under vacuum. The product obtained, 391.5 g TMP-oleate with an OH-value of 285 mg KOH/g, was a bright pale oil at 20° C.

1 mole (391.5 g) of TMP-oleate as produced above was reacted at a temperature of 150° C. with 1 mole (148.2 g) of phthalic anhydride in a glass bulb provided with a stirrer and a thermometer. Then 539 g of TMP-oleate phthalate with an acid value of 99 mg KOH/g was obtained. The product was a viscous oil at 20° C.

EXAMPLE 2

1 mole (138.4 g) of pentaerythritol (PENTA), 2.7 moles (427.1 g) of pelargonic acid (an aliphatic C9-acid) and 65 g of xylene were charged into a glass bulb provided with a stirrer, a water separator, a thermometer and an inert-gas supply.

The temperature was raised successively to 250° C., whereupon any esterification water formed was separated. At an acid number less than 3 mg KOH/g, the reaction was stopped. The remaining xylene was separated under vacuum. 517 g of PENTA pelargonate in the form of a bright, pale oil at 20° C. and with an OH-value of 135 mg KOH/g was obtained.

1 mole (517 g) of PENTA pelargonate was reacted at a temperature of 150° C. with 1 mole (98 g) of maleic acid anhydride in a glass bulb provided with a stirrer and a thermometer. Thereby, 609 g of PENTA pelargonate maleate with an acid number of 88 mg KOH/g was obtained after suction filtration. The product was a bright, pale oil at 20° C.

EXAMPLE 3

1 mole (138.4 g) of pentaerythritol (PENTA), 3 moles (432 g) of 2-ethyl-hexanoic acid and 65 g of toluene were charged into a glass bulb provided with a stirrer, a water separator, a thermometer and an inert-gas supply. The toluene was used for the azeotropic removal by distillation of any esterification water formed.

The temperature was raised successively to 250° C., whereupon any esterification water formed was separated. At an acid number less than 3 mg KOH/g the reaction was stopped. The remaining toluene was separated. 517 g of PENTA-2-ethylhexoate with an OH-value of 108 mg KOH/g was obtained. The product was a bright, pale oil at 20° C.

1 mole (517 g) of PENTA-2-ethylhexoate was reacted with 1 mole of (146.1 g) adipic acid under a nitrogen gas atmosphere in a glass bulb provided with a stirrer and a thermometer in the presence of toluene and at a temperature of 250° C. The reaction was continued for 1.5 hours, whereupon any esterification water formed was separated. Then the toluene was separated under vacuum. 641 g of PENTA-2-ethylhexoate adipate with an acid number of 80 mg KOH/g was obtained. The product was a low viscous oil at 40° C.

EXAMPLE 4

1 mole (138.4 g) of pentaerythritol (PENTA), 1 mole (273.3 g) of oleic acid and 65 g of xylene were charged into a glass bulb provided with a stirrer, a water separator, a thermometer and an inert-gas supply.

The temperature was successively raised to 250° C., whereupon any esterification water formed was separated. At an acid number less than 1 mg KOH/g, the reaction was stopped. The remaining xylene was separated under vacuum. The product was pressure filtered to remove the unreacted PENTA. 370 g of PENTA-oleate with an OH-value of 226 mg KOH/g was obtained. The product was viscous light-brown oil at 20° C.

286 g of PENTA-oleate was reacted at a temperature of 150° C. with 108 g of phthalic anhydride in a glass bulb provided with a stirrer and a thermometer. After a filtration 355 g of PENTA-oleate phthalate with an acid number of 98 mg KOH/g was obtained. The product was a viscous oil at 20° C.

EXAMPLE 5

1 mole (136.2 g) of trimethylol propane (TMP), 2.2 moles (317 g) of 2-ethylhexanoic acid and 20 g of xylene were charged into a glass bulb provided with a stirrer, a water separator, a thermometer and an inert-gas supply. The xylene was used for the azeotropic removal by distillation of any esterification water formed.

The temperature was raised successively to 260° C., whereupon any esterification water formed was separated. At an acid number less than 2 mg KOH/g, the reaction was stopped. The remaining xylene was separated under vacuum. 411 g of TMP-2-ethylhexoate with an OH-value of 99 mg KOH/g was obtained. The product was a pale low viscous oil at 20° C.

1 mole (411 g) of TMP-2-ethylhexoate and 0.8 mole (117 g) of adipic acid were charged into a glass bulb provided with a stirrer, a thermometer and an inert-gas supply. The temperature was raised successively to 250° C. and kept there for 30 minutes at atmospheric pressure and then for another 30 minutes under vacuum (a pressure of 100 mm Hg). Then 514 g of TMP-2-ethylhexoate adipate with an acid number of 91 mg KOH/g was obtained. The product was a low viscous oil at 40° C.

EXAMPLE 6

1 mole (517 g) of PENTA-2-ethylhexoate produced according to Example 3 was reacted with 1 mole (188 g) of azelaic acid at 250° C. under a nitrogen gas atmosphere in a glass bulb provided with a stirrer and a thermometer. The reaction was continued for 1.5 hours at atmospheric pressure and thereafter for another 30 minutes under vacuum (a pressure of 80 mm Hg). All the time the temperature was 250° C. Then 680 g of PENTA-2-ethylhexoate azelate with an acid number of 72 mg KOH/g was obtained. The product was a low viscous oil at 40° C.

EXAMPLE 7

1 mole (250 g) of di-trimethylol propane (Di-TMP), 2.8 moles (403 g) of 2-ethylhexanoic acid and 30 g of xylene were charged into a glass bulb provided with a stirrer, a water separator, a thermometer and an inert-gas supply. The xylene was used for azeotropic water separation.

The temperature was raised slowly to 260° C., whereupon sny esterification water formed was separated. At an acid number less than 2 mg KOH/g, the heating was interrupted and the remaining xylene was separated under vacuum. 603 g of Di-TMP-2-ethylhexoate with an OH-value of 109 mg KOH/g was obtained. The product was a pale low viscous oil at 20° C.

1 mole (603 g) of Di-TMP-2-ethylhexoate and 1.2 moles (175 g) of adipic acid were charged into a glass bulb provided with a stirrer, a thermometer and an inert-gas supply. The temperature was raised successively to 250° C. and kept there for 30 minutes at atmospheric pressure and then for another 30 minutes under vacuum (a pressure of 100 mm Hg). Then 756 g of Di-TMP-2-ethylhexoate adipate with an acid number of 87 mg KOH/g was obtained. The product was a low viscous oil at 40° C.

EXAMPLE 8

25 g of TMP-oleate phthalate produced according to Example 1 was mixed with 4 g of N,N-dimethyl ethanolamine. 1 g of water was added with stirring to the mixture obtained whereby a mixture containing 3.3 per cent of water was obtained. The mixture is very suitable as a heat storing and temperature equalizing liquid in the pores of the moulding parts made of sintered metal of a moulding tool, for example, intended for injection moulding or compression moulding of plastic products. The mixture will also prevent the pores from being clogged by by-products formed during the moulding of the polymer products or by fillers etc. in the plastics material used.

EXAMPLE 9

25 g of PENTA pelargonate maleate produced according to Example 2 was mixed with 10 g of triethanolamine. 2 g of water was added with stirring to the mixture obtained, whereby a mixture containing 5.4 per cent of water was obtained. This mixture can be used for the same field of use as mentioned in Example 8.

EXAMPLE 10

25 g of PENTA-2-ethylhexoate adipate produced according to Example 3 was mixed with 10 g of triethanolamine. 0.5 g of water was added with stirring to the mixture obtained, whereby a mixture containing 1.4 per cent of water was obtained. This mixture can be used for the same field of use as mentioned in Example 8.

EXAMPLE 11

25 g of PENTA-oleate phthalate produced according to Example 4 was mixed with 10 g of triisopropanol amine. 3 g of water was added with stirring to the mixture obtained, whereby a mixture containing 7.9 per cent of water was obtained. This mixture could be used for the same field of application as disclosed in Example 8.

EXAMPLE 12

25 g of TMP-2-ethylhexoate adipate produced according to Example 5 was mixed with 3.6 g of diethanolamine and 2.9 g of diethyleneglycol monobutylether. 3 g of water was added with stirring to the mixture obtained, whereby a mixture containing 8.7 per cent of water was obtained. The mixture was very suitable for the same field of application as disclosed in Example 8.

EXAMPLE 13

25 g of PENTA-2-ethylhexoate azelate produced according to Example 6 was mixed with 12 g of triethanolamine and 3.7 g of diethyleneglycol monobutylether. 5 g of water was added to the mixture obtained, whereby a mixture containing 12.3 per cent of water was obtained. The mixture was very suitable for the same field of application as disclosed in Example 8.

EXAMPLE 14

25 g of Di-TMP-2-ethylhexoate adipate produced according to Example 7 was mixed with 5.2 g of N,N-dimethylaminomethyl propanol and 3.0 g of diethylenglycol monobutylether. 4 g of water was added to the mixture obtained, whereby a mixture containing 10.8 per cent of water was obtained. The mixture is very suitable for the same field of application as mentioned in Example 8.

The invention is not limited to the embodiments shown, since these can be modified in different ways within the scope of the present invention.

We claim:

1. Method for regulation of process conditions in a moulding tool intended for production of products of natural or synthetic polymers, which moulding tool comprises one or more moulding parts made of sintered metal with communicating pores obtained by pressing at a high pressure and sintering at a high temperature of a powdered material, in which moulding part or parts a moulding cavity has then been made, whereby the pores forming a pore system are open towards the moulding cavity, while the moulding too has an outer envelop surface which is tightened against leakage, which comprises filling the communicating pores during the entire production cycle with a liquid of high vaporizing temperature, which liquid is stationary during said cycle in the pores system, and regulating pressure on the liquid in the pores by means of a suitable pressure producer connected with the communicating pores in the moulding tool in such a manner that the liquid will be forced very slowly out of the pores into the moulding cavity and form a thin layer on the surface of the cavity;

wherein a thermosetting resin is moulded, wherein a gaseous state curing agent or catalyst which is inert to the liquid in the pores is used as a pressure medium for said liquid, which curing agent or catalyst will pass through the liquid and reach the resin in the moulding cavity which is closed in a concentration large enough to cure the thermosetting resin.

2. Method according to claim 1, wherein the pressure on the liquid is automatically increased to counteract a mould inner pressure against the liquid in the pores, said mould inner pressure being created when polymer is introduced into the moulding tool which is closed and the pressure on the liquid is automatically decreased when the moulding tool is opened again and the mould inner pressure is released.

3. Method according to claim 1, characterized in that the liquid prevents the pores from being clogged by by-products formed during the moulding of the polymer products or by fillers in a polymer material used.

4. Method according to claim 1, wherein the liquid is intended to absorb any air, steam or other gases formed during the moulding, whereby said absorbed gases can then be released from the liquid when the moulding tool is opened after each production cycle.

5. Method according to claim 1, characterized in that an even tempering in the moulding tool is obtained by distribution of the liquid in the entire pore system.

6. Method according to claim 1, characterized in that the moulding tool is heated or cooled by outside means or by circulating a temperature regulating medium via channels with tight walls arranged in the porous moulding parts or any other parts of the moulding tool.

7. Method according to claim 6, characterized in that the moulding tool is regulated to be at a temperature between about $+50°$ C. and about $+240°$ C.

8. Method according to claim 1, characterized in that the moulding tool is intended for injection moulding, compression moulding, blow moulding or extrusion.

9. Method according to claim 1, wherein the resin is selected from the group consisting of polyester, polyurethane, urea-formaldehyde, phenol-formaldehyde, and melamine-formaldehyde.

10. Method according to claim 1, characterized in that the liquid works as a lubricant or a release agent in the moulding cavity.

11. Method according to claim 1, characterized in that the liquid used is a synthetic product or a natural product selected from the group consisting of an ester, silicon oil, wax and paraffin.

12. Method according to claim 11, characterized in that the ester consists of a reaction product of a polyalcohol and a monocarboxylic acid or a di-basic or tri-basic carboxylic acid. in that an even tempering 13. Method according to claim 11, characterized in that the synthetic product has hydrophilic properties.

14. Method according to claim 11, characterized in that the synthetic product has hydrophilic properties obtained by an ammonium ion, a protonized amine or a protonized substituted amine in the ester.

15. Method according to claim 1, characterized in that a pressure sensor is placed in connection to the moulding cavity to sense the pressure in the moulding cavity, whereby the pressure sensor is connected with the pressure producer and regulates the pressure on the liquid in the pores, applied by said pressure producer.

16. Method according to claim 1, characterized in that the pressure producer is a gas containing container, whereby the gas exerts a pressure on the liquid.

17. Method according to claim 16, wherein the gas consists of nitrogen, carbon dioxide or air.

18. Method according to claim 1, wherein the gaseous curing agent or catalyst is sulphur dioxide, a tertiary amine, emthyl formate, ethyl formate or propyl formate.

19. Method according to claim 1, characterized in that the liquid used contains a component consisting of a mixture of compounds with the general formula where R is

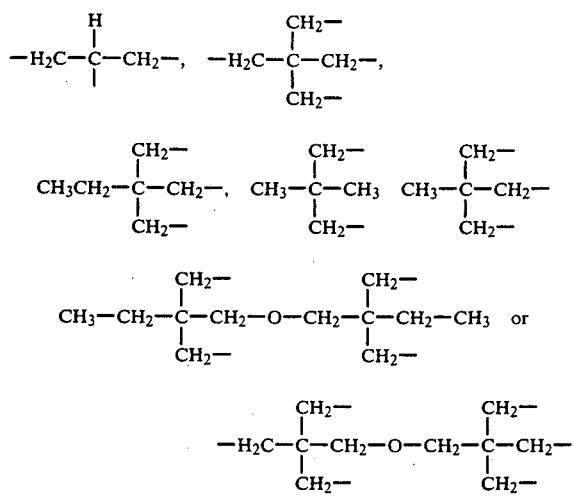

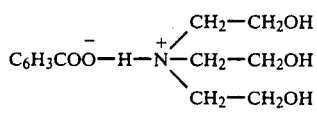

or $C_6H_{10}$ $R_1$ is $C_4H_9$, $C_5H_{11}$, $C_6H_{13}$, $X_7H_{15}$, $C_8H_{17}$, $C_9H_{19}$, $C_{11}H_{23}$, $C_{13}H_{27}$, $C_{15}H_{31}$, $C_{17}H_{35}$, $C_{17}H_{33}$, $C_{17}H_{31}$, $C_{19}H_{39}$, $C_{21}H_{43}$, $C_{23}H_{47}$ or $C_{17}H_{34}OH$, where $R_2$ is $CH_2$, $C_2H_4$, $C_3H_6$, $C_4H_8$, $C_7H_{14}$, $C_8H_{16}$, $C_2H_2$, $C_6H_4$, $C_6H_3COOH$, $C_6H_3COO-NH_4$, $$C_6H_3\overset{-}{COO}-H-\overset{+}{N}\diagdown\begin{matrix}CH_2-CH_2OH\\CH_2-CH_2OH\\CH_2-CH_2OH\end{matrix}$$

or $C_6H_{10}$ and $R_3^\oplus$ consists of an ammonium ion, a protonized monoethanolamine, diethanolamine, triethanolamine, diisopropanolamine, triisopropanolamine, N,N-dimethylethanolamine, N,N-diemthylaminometylpropanol, aminomethylpropanol, triethylamine or morpholine, at the same time as the compounds in the mixture only differ from each other in respect of the values for m, n and p, so that also the mixture can be represented by the above formula I, whereby the means value ($\overline{m}$) for m is between 3 and 8, the mean value ($\overline{n}$) for n is less than ($\overline{m}$) and the mean value ($\overline{p}$) for p is between 0.5 and 8, preferably between 0.5 and 3.

20. Method according to claim 19, characterized in that

R is 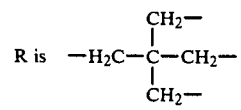

$R_1$ l is $C_7H_{15}$ eller $C_{17}H_{33}$,
$\overline{n} = 2.0-3.5$
$R_2$ is $C_2H_4$, $C_3H_6$, $C_4H_8$, $C_7H_{14}$, $C_8H_{16}$, $C_2H_2$ or $C_6H_4$;
$R_3^\beta$ is a protonized triethanolamine, diethanolamine, N,N-dimethylaminomethylpropanol, N,N-dimethylethanolamine or triisopropanolamine
$\overline{p} = 0.5-2.0$ and
$\overline{m} = 4$.

21. Method according to claim 19, characterized in that

R is 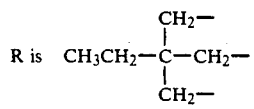

$R_1$ is $C_7H_{15}$ or $C_{17}H_{33}$,
$\overline{n} = 1,0-2,5$
$R_2$ is $C_2H_4$, $C_3H_6$, $C_4H_8$, $C_7H_{14}$, $C_8H_{16}$, $C_2H_2$ or $C_6H_4$;
$R_3^\oplus$ is a protonized triethanolamine, diethanolamine, N,N-dimethylaminomethylpropanol, N,N-dimethyletanolamine or triisopropanolamine;
$\overline{p} = 0.5-1.5$ and
$\overline{m} = 3$.

22. Method according to claim 1, characterized in that the liquid used contains an emulsifier.

* * * * *